United States Patent [19]
Crowley et al.

[11] Patent Number: 5,262,098
[45] Date of Patent: Nov. 16, 1993

[54] METHOD AND APPARATUS FOR FABRICATING BICHROMAL BALLS FOR A TWISTING BALL DISPLAY

[75] Inventors: Joseph M. Crowley, Morgan Hill; Edward A. Richley, Palo Alto; Nicholas K. Sheridon, Los Altos, all of Calif.

[73] Assignee: Xerox Corporation, Stamford, Conn.

[21] Appl. No.: 46,505

[22] Filed: Apr. 12, 1993

Related U.S. Application Data

[63] Continuation of Ser. No. 996,299, Dec. 23, 1992, abandoned.

[51] Int. Cl.$^5$ .............................................. B29B 9/10
[52] U.S. Cl. ................................... 264/8; 264/5; 264/10; 425/6; 425/8
[58] Field of Search .................. 264/5, 8, 10, 13; 425/6, 8, 10

[56] References Cited

U.S. PATENT DOCUMENTS

| | | | |
|---|---|---|---|
| 4,315,720 | 2/1982 | Ueda et al. | 425/8 |
| 4,599,294 | 7/1986 | Matsumoto et al. | 264/8 |
| 4,613,076 | 9/1986 | Dietz et al. | 264/8 |
| 4,701,289 | 10/1987 | Liles et al. | 264/8 |

OTHER PUBLICATIONS

Kondo, Asaji; Microcapsile Processing and Technology; Marcel Dekker, New York, N.Y.; pp. 63 to 67.
Walton and Prewett; The Production of Sprays and Mists of Uniform Drop Size by Means of Spinning Disc Type Sprayers; The Proceedings of the Physical Society, Section B; vol. 62, Part 6, 1 Jun. 1949, No. 354B; pp. 341 to 350.
Bals, E. J.; Design of Rotary Atomizers; Proc. 4th Int. agric. Aviat. Congr. (Kingston, 1969); pp. 156 to 165.
Dombrowski and Lloyd; Atomisation of Liquids by Spinning Cups; The Chemical Engineering Journal, 8 (1974); pp. 63 to 81.
Balachandran and Bailey; The Influence of Electrostatic Fields on the Centrifugal Atomisation of Liquids; Journal of Electrostatics, 10 (1981); pp. 189 to 196.
Balachandran and Bailey; The Dispersion of Liquids Using Centrifugal and Electrostatic Forces; IEEE Transactions on Industry Applications, vol. 1A-20, No. 3, May/Jun. 1984; pp. 682 to 686.

*Primary Examiner*—Mary Lynn Theisen

[57] ABSTRACT

An apparatus for fabricating hemispherically bichromal balls, comprising a separator member having opposing first and second surfaces located and an edge region in contact with both surfaces, and delivery means for flowing first and second colored hardenable liquid material over the first and second surfaces, respectively, so that the liquid materials arrive at the edge at substantially the same flow rate and form a reservoir outboard of the edge region. The reservoir comprises side-by-side regions of different colors which do not intermix. Further means is provided for propelling the first and second liquid materials away from the separator member and out of the reservoir into a fluid medium as a plurality of side-by-side bichromal streams whose forward ends become unstable and break up into droplets which form into spherical balls, each of the balls comprising hemispheres of differently colored hardenable liquid, and means for collecting the bichromal balls.

13 Claims, 6 Drawing Sheets

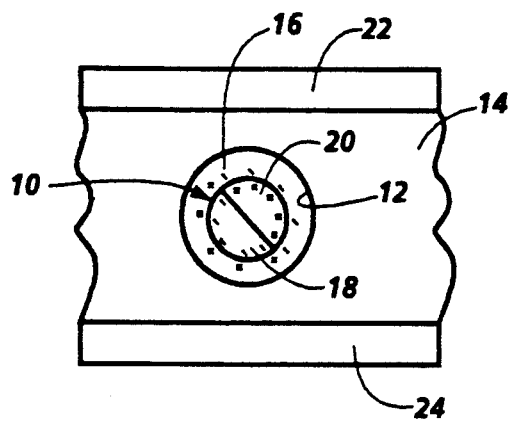
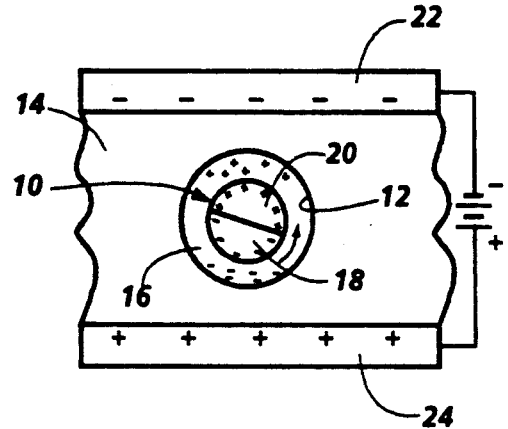
Fig. 1a  Fig. 1b
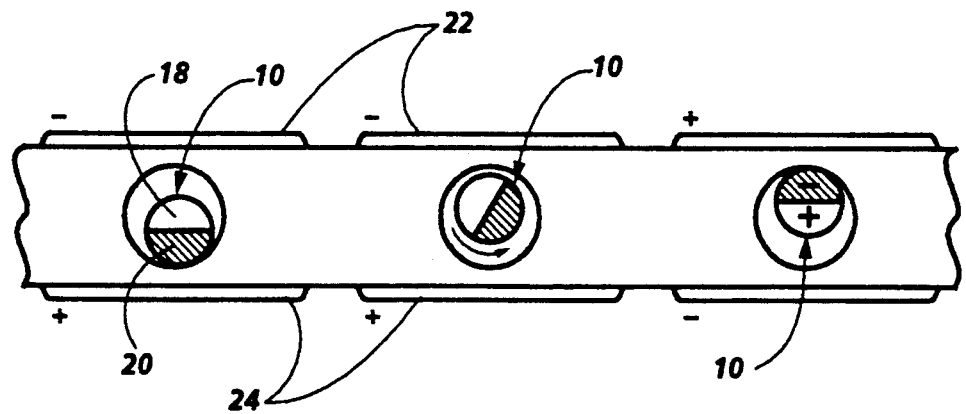
Fig. 2

METHOD AND APPARATUS FOR FABRICATING BICHROMAL BALLS FOR A TWISTING BALL DISPLAY

This is a continuation of application Ser. No. 07/996,299, filed Dec. 23, 1992, now abandoned.

FIELD OF THE INVENTION

This invention relates to the large scale fabrication of small balls, about 5 to 200 microns in diameter, having hemispheres of contrasting colors for use in an "electric paper" display sheet.

BACKGROUND OF THE INVENTION

A display sheet and display system is disclosed in a copending patent application, assigned to the same assignee as this application, U.S. Ser. No. 07/433,311 filed Nov. 8, 1989, now abandoned, entitled "Paper-Like Computer Output Display and Scanning System Therefor" which is fully incorporated herein by reference. Also incorporated herein by reference are U.S. Pat. Nos. 4,126,854 and 4,143,103 and an article entitled "The Gyricon—A Twisting Ball Display", published in the Proceedings of the S.I.D., Vol. 18/3 and 4, Third and Fourth Quarters 1977.

The display device, in sheet form, as described in the copending application comprises a thin transparent sheet having many of the attributes of paper documents. It looks like paper, has ambient light valve behavior like paper (i.e. the brighter the ambient light, the more easily it may be seen), is flexible like paper, can be carried around like paper, can be written on like paper, can be copied like paper, and has nearly the archival memory of paper. The salient features of this display material are an elastomeric host layer a few mils thick which is heavily loaded with hemispherically bichromal balls, each in the range of 5 to 200 microns in diameter. Each bichromal ball has hemispheres of contrasting colors, such as a white half and a black half, and is contained in its own spherical cavity filled with a dielectric liquid. Upon application of an electrical field between electrodes located on opposite surfaces of the host layer, the balls will rotate to present one or the other hemisphere to an observer, depending on the polarity of the field.

In the above-identified article, there is disclosed a method for fabricating bichromal balls. First, monochromatic glass balls are formed, e.g. heavily loaded with titanium dioxide so as to appear white. These are deposited in a monolayer upon a substrate. Then the balls are coated from one direction in a vacuum evaporation chamber with a dense layer of nonconductive black material which coats only one hemisphere.

As illustrated in FIG. 1a bichromal balls 10 are loaded in liquid filled cavities 12 in a host matrix 14. Both the liquid 16 surrounding the balls and the balls themselves are dielectric. Therefore, although the balls are macroscopically electrically neutral, on a microscopic scale they have an electrical double layer comprising two layers of charges of opposite sign (as shown). One charge layer is localized at the surface of the ball and the other charge layer is in the nature of a space charge extending outward from the surface of the ball into the dielectric liquid. The measurable aspect of the electrical double layer is known as the zeta potential. The zeta potential is determined by the net surface and volume charge that lies within a shear surface associated with the motion of the ball through the liquid under an applied field. For a given liquid, the zeta potential is a function only of the ball surface material. Thus, the material properties which give rise to differences associated with the color or reflectivity of each hemisphere 18 and 20 give rise to different characteristic zeta potentials with respect to the dielectric liquid 16 in the cavity 12. It is the difference in zeta potential between the hemispheres of the ball which causes the ball to act like a dipole in the presence of an electrical field, as illustrated in FIG. 1b. The ball 10 will rotate, until its dipole vector lines up with the direction of the electrical field established between opposed electrodes 22 and 24.

In addition to the dipole charge distribution found on the bichromal ball in the presence of an electrical field there is also a monopole charge which is the net electrical charge of the entire ball. It is quite unlikely that the two hemispheres 18 and 20 having zeta potentials of opposite polarity will have the same magnitude. However, if that is the case, a monopole charge will not be established. As a result of the monopole charge, the ball 10 is caused to translate in the direction of the electrical field and will rest and be retained against the cavity wall, as illustrated in FIG. 2. In order for the ball to rotate easily in the liquid within the cavity, due to the dipole charge, it must move from contact with the cavity wall. When at rest against the cavity wall, friction and other forces will prevent it from rotating until it has been moved away once again, due to the monopole charge. It is this feature which enables long term image retention in this display device. In a copending patent application, assigned to the same assignee as this application, U.S. Ser. No. 07/784,294 filed Oct. 24, 1991, entitled "Method and Apparatus for Fabricating Bichromal Balls for a Twisting Ball Display", which is fully incorporated herein by reference, there is disclosed the flowing together of two streams of differently colored hardenable liquids into the center of a laminarly flowing host liquid to form a side-by-side bichromal stream. As the bichromal stream is transported by the host liquid as a free jet, its forward end becomes unstable and breaks up into droplets which form into spherical balls as they are moved by the host liquid. Further transport of the balls moves them past a hardening station and a separating station.

It is an object of the present invention to provide a simplified method, capable of large production rates, for forming hemispherically bichromal balls.

SUMMARY OF THE INVENTION

The present invention may be carried out, in one form, by providing an apparatus for fabricating hemispherically bichromal balls, comprising a separator member having a first surface, a second surface located opposite the first surface and an edge region in contact with both surfaces, and means for flowing first and second colored hardenable liquid material over the first and second surfaces, respectively, so that the liquid materials arrive at the edge at substantially the same flow rate and form a reservoir outboard of the edge region. The reservoir comprises side-by-side regions of different colors which do not intermix. Further means is provided for propelling the first and second liquid materials out of the reservoir into a fluid medium as a plurality of side-by-side bichromal streams whose forward ends become unstable and break up into droplets which form into spherical balls, each of the balls comprising hemispheres of differently colored hardenable liquid, and means for collecting the bichromal balls.

BRIEF DESCRIPTION OF THE DRAWINGS

Other objects and further features and advantages of this invention will be apparent from the following, more particular, description considered together with the accompanying drawings, wherein:

FIG. 1a is schematic representation of an electrical double layer associated with each ball hemisphere within a dielectric liquid filled cavity, before the application of an electrical field, FIG. 1b is schematic representation of an electrical double layer associated with each ball hemisphere within a dielectric liquid filled cavity after the application of an electrical field causes the ball to rotate, FIG. 2 is schematic representation of rotation and translation of the bichromal ball within its cavity.

DESCRIPTION OF THE ILLUSTRATED EMBODIMENTS

Figure 3:
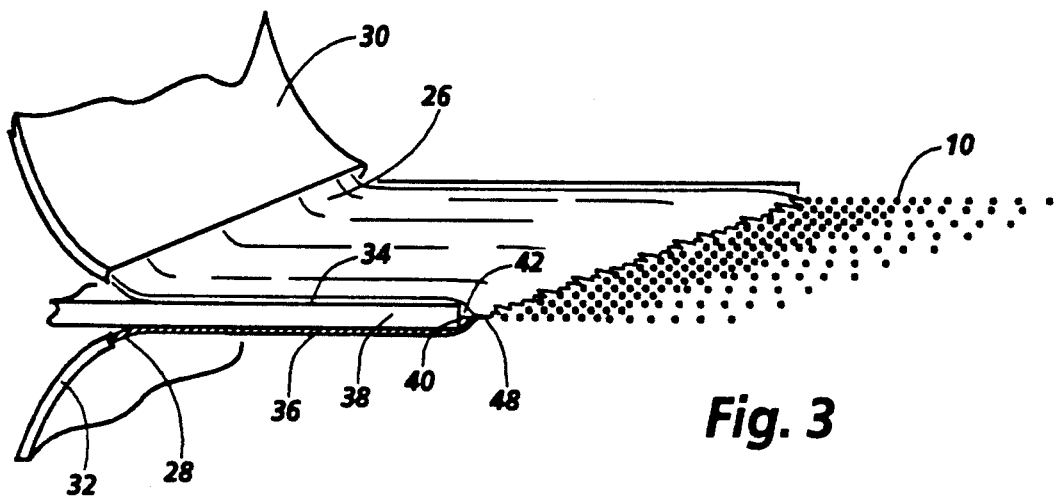
FIG. 3 is a schematic perspective view of the two differently colored streams of hardenable liquid being flowed over the top and bottom surfaces of a separator member and forming side-by-side bichromal free jets outboard of thereof.
Figure 3A:
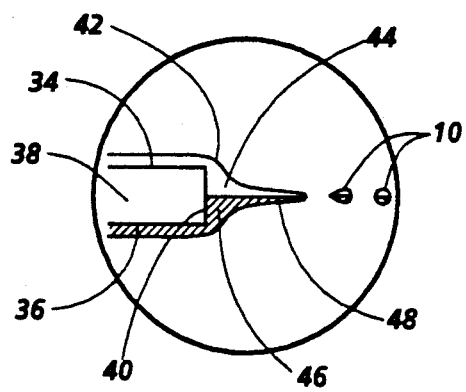
FIG. 3a is an enlarged schematic elevation view showing the ball formation region of FIG. 3.

Turning to FIG. 3 there is illustrated the generalized form of the fabrication apparatus for making small, pigmented (or dyed) balls 10 that have hemispheres 18 and 20 of two different colors. Two fine planar streams 26 and 28 of a hardenable liquid material are pumped through enlongated nozzles 30 and 32 whose ends direct the two fine streams onto opposite planar surfaces 34 and 36 of separator member 38. The liquids flow to the ends of the planar surfaces and over the edge 40 where they form an outboard reservoir 42 of liquid material. By controlling the dispensing rate of each stream relative to the surface distance over which each must flow, it is possible to equalize the flow rate at which each stream reaches the edge, thus enabling the reservoir 42 to include equal amounts of each liquid. It should be noted that the liquids do not intermix, so that the reservoir includes side-by-side portions 44 and 46 thereof. When the rate of flow of the liquids away from the separator edge 40, into the host fluid (air is shown), is great enough, free jets 48 are formed. Each jet comprises a ligament of liquid fed by the reservoir at its originating end and breaking up into side-by-side bichromal balls 10 at its distal end. As the balls continue in their flight, they harden and drop under the influence of gravity, and are finally collected.

Experimentally, we have used molten carnauba wax and molten polyethylene, both of which flow freely when sufficiently heated and freeze to a hardened form. We have pigmented the carnauba wax to make white and black balls according to the following formulations:

For the white wax we used 10 parts carnauba wax, 5 parts $TiO_2$, and 0.1 parts of Aerosol OT-100 (trademark of American Cyanamid Co. of Wayne, N.J.), a surface active agent which improves the ability of the pigment to be dispersed in the wax.

For the black wax we used 10 parts carnauba wax, 1.5 parts Ferro V-302 (trademark of Ferro Corporation of Cleveland, Ohio), a black inorganic pigment, and 0.1 parts Aerosol OT-100.

Figure 4:
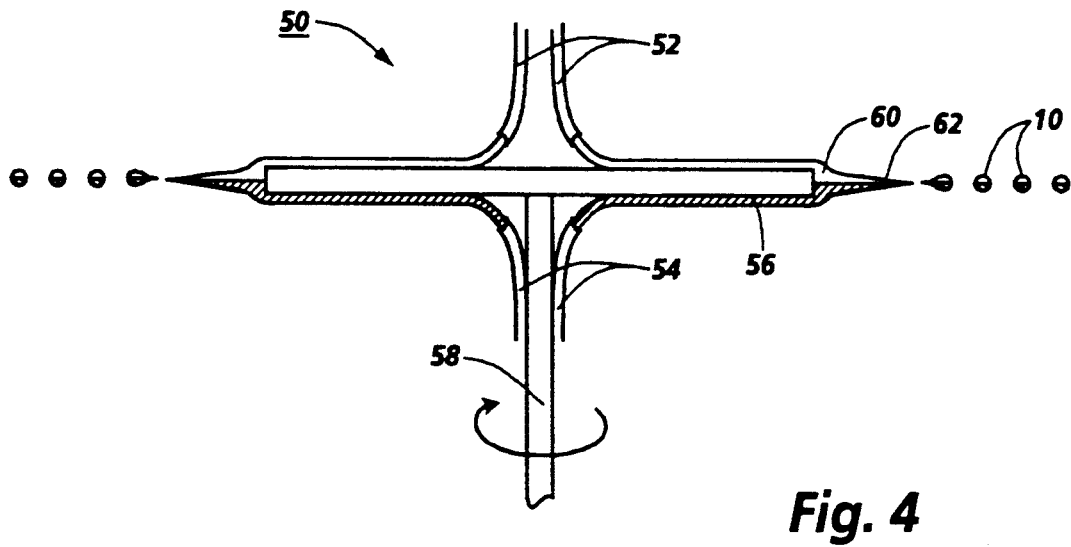
FIG. 4 is a schematic elevation view of a spinning disc separator for fabricating bichromal balls.
Figure 5:
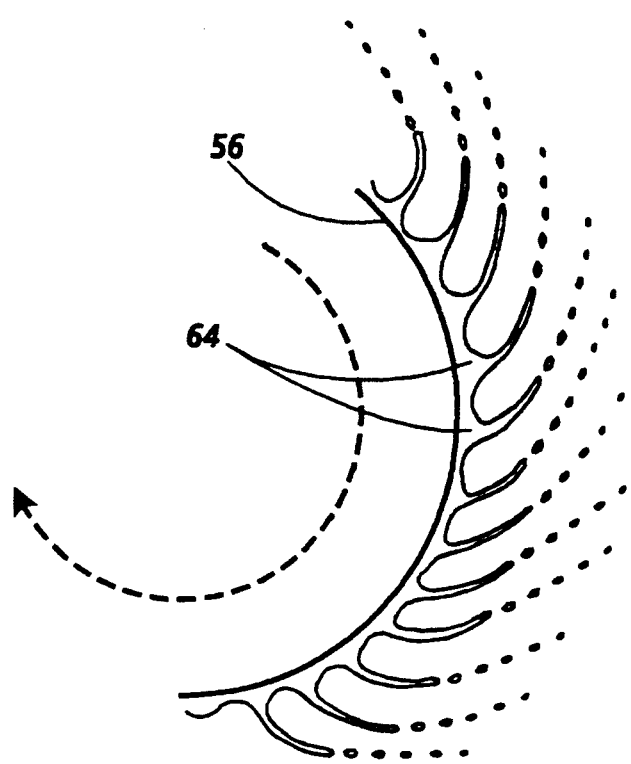
FIG. 5 is an enlarged schematic plan view of a portion of a spinning disc showing the free jets, or ligaments, from which the balls emanate.
Figure 6:
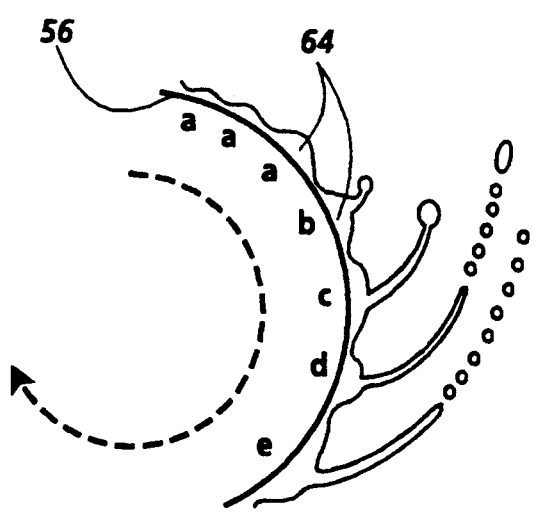
FIG. 6 is an enlarged schematic plan view showing the genesis of the free jets, or ligaments, from which the balls emanate.

A spinning disc configuration 50 of the fabrication apparatus, as illustrated in FIG. 4, has been found to be the best mode for making hemispherically bichromal balls of the size required. The white pigmented and black pigmented hardenable liquids are introduced, via suitable dispensing nozzles 52 and 54, to the upper and lower surfaces of disc 56 mounted upon a rotatable spindle 58. The liquids are moved to the periphery thereof, on their respective sides, under the influence of centrifugal force. At the edge of the disc they will flow together (but not mix) to form a peripheral side-by-side bichromal reservoir 60 from which ligaments 62 will extend, whose distal ends will dispense the balls 10 (note FIGS. 5 and 6). It has been found that a 3 inch diameter disc about 20 mils thick, rotated at about 2600 to 3000 rpm successfully produces balls about 4 mils in diameter. At too high rotational speeds, the liquids come off their respective surfaces at the square edge without flowing together, resulting in smaller black and white monochrome balls. Of course, it is known that suitable modifications may be made to the square edge to allow the liquids to flow together at higher speeds, e.g. rounding or tapering the edge.

Liquid flowing over the edge of the spinning disc 56 tends to form an outboard reservoir 60 in the form of a ring of non-uniform diameter. This ring moves at the same speed as the disc and has circumferential protrusions 64, known as "Taylor instabilities", caused by the centrifugal force acting against surface tension. The mechanism of ball formation is sequentially illustrated in FIG. 6. Initially, as the liquids form the reservoir, the protrusions are formed, at (a). As more material is fed into the reservoir, each protrusion starts to peak, at (b), and will release a large droplet of the liquid which is attached to the protrusion by a ligament, or feeding tube of the liquid, at (c). Finally, the large drop breaks away followed by smaller droplets, at (d). A relatively stable steady state condition then exists, with liquid being fed into the reservoir and into the ligaments, and substantially uniform droplets being ejected into the host fluid from the distal ends of the ligaments, at (e). This inertial structure of spinning ligaments trailing the disc (as clearly illustrated in FIG. 5) is held together by surface tension, which also causes their distal ends to be unstable and to break up into droplets. It is not necessary that the circumference of the disc be regular. In fact, a circumferential toothed structure will cause the "Taylor instabilities" and the resultant ligaments to be located coincident with each tooth. This allows a tailoring of the ligament structure and some added control over the size of the balls.

Figure 7:
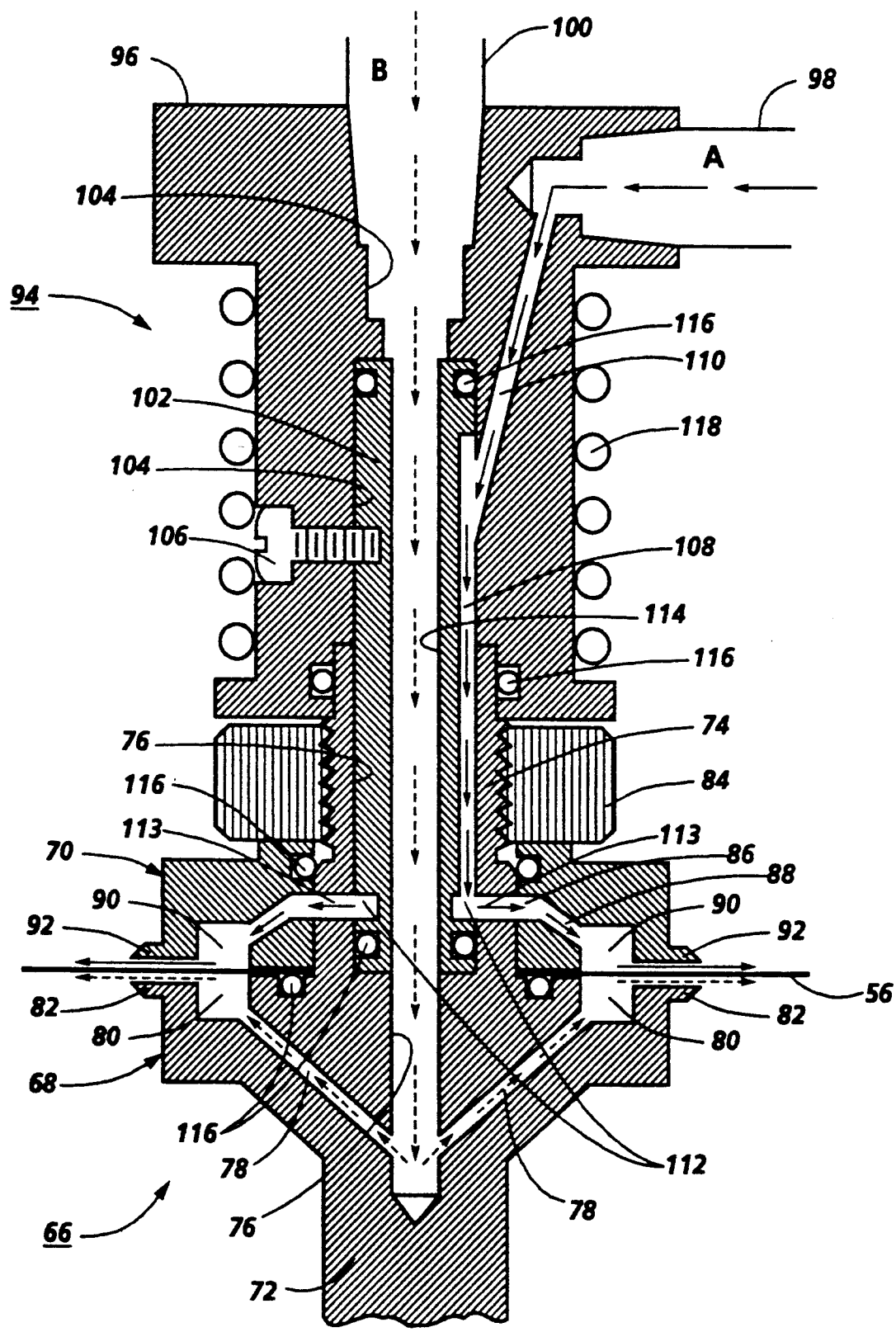
FIG. 7 is an enlarged sectional view of the liquid feeding structure for flowing the hardenable liquid material over the separator surfaces.

A liquid supply structure which has been found to work satisfactorily is illustrated in more detail in FIG. 7. It comprises a rotatable dispensing assembly 66 including a lower liquid metering member 68 and an upper liquid metering member 70 which support the disc 56 therebetween. The lower metering member includes a spindle portion 72, mountable upon and rotatable by a suitable motor (not shown), a coupling extension 74 having a central bore 76 for receiving liquid, a number of radially extending, upwardly angled liquid supply ports 78, a circular reservoir 80 and circular metering lip 82 for delivering a thin layer of liquid to the lower surface of the disc. The upper metering member 70 encircles the coupling extension 74 and is secured in place by a locking nut 84. It includes an inner groove 86 communicating with a number of radially extending, downwardly angled liquid supply ports 88 which, in turn, communicate with a circular reservoir 90 and a circular metering lip 92 for delivering a thin layer of liquid to the upper surface of the disc.

A stationary liquid delivery assembly 94 is seated upon the rotatable dispensing assembly 66 for delivering the white and black liquids to their respective surfaces of the disc 56. The delivery assembly 94 includes an external coupling member 96, to which suitable delivery hoses 98 and 100 can be connected, and an internal routing member 102 for directing the liquids to the appropriate sides of the disc. Coupling member 96 has a central bore 104 therein which receives the upper half of routing member 102, secured in position by a set screw 106. When properly seated, an axially extending channel 108 on the periphery of the routing member 102 is in alignment with a port 110 passing through the external coupling member 96 and communicating with one hose 98. The lower end of the axially extending channel 108 terminates in a circular groove 112 on the periphery of the routing member. A central bore 114 through the routing member is in alignment with the central bore 104 in the coupling member 96 which communicates with the other hose 100.

The rotatable dispensing assembly 66 and the stationary liquid delivery assembly 94 are connected by inserting the coupling extension 74 of the lower metering member 68 into the central bore 104 in the coupling member 96. This introduces the lower half of the routing member 102 into the central bore 76 of the lower metering member 68. When so connected the circular groove 112 is in alignment with a number of axial ports 113 passing through the coupling extension 74 which, in turn, is in communication with inner groove 86. O-rings 116, seated in grooves throughout this assembly, provide suitable seals between the rotatable dispensing assembly and the stationary liquid delivery assembly to prevent the two liquids from leaking out of their respective flow paths which are represented by arrows A and B.

As has been described above, the black and white pigmented liquids are delivered to these metering members in a heated, molten state (for the pigmented carnauba waxes, about 120° C.; for polyethylene, about 240° C.) so that they flow freely and do not harden prematurely, i.e. long enough to prevent the ligaments from freezing. A heating coil 118, or other heating device, may be placed in contact with the stationary liquid delivery assembly 94. It has been found that with liquid wax, O-rings made of a fluorocarbon rubber such as Viton (trademark of E.I. duPont de Nemours) are appropriate to withstand the required temperature and, in fact, are lubricated by the liquid. A pressure head of about 10 psi has been found to be satisfactory for feeding the liquids through their respective paths, to fill the reservoirs and to feed them uniformly through metering slots at a thickness of about 2 to 4 mils onto the entire opposing surfaces of the disc so that they fill the outboard reservoir equally without mixing, form ligaments and, finally, form hemispheric bichromal balls.

Figure 8:
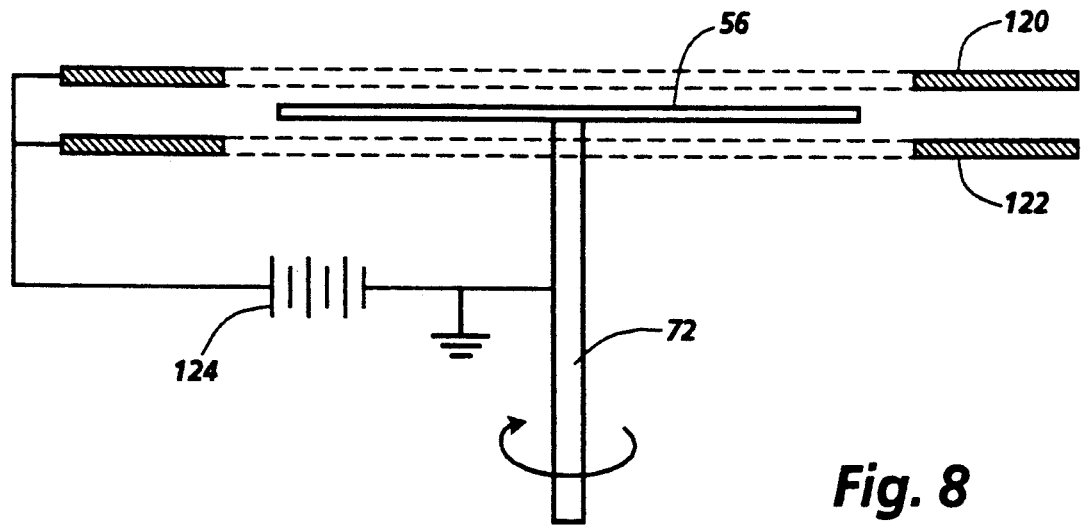
FIG. 8 is a schematic view of the spinning disc ball generator with outboard electrodes.
Figure 9:
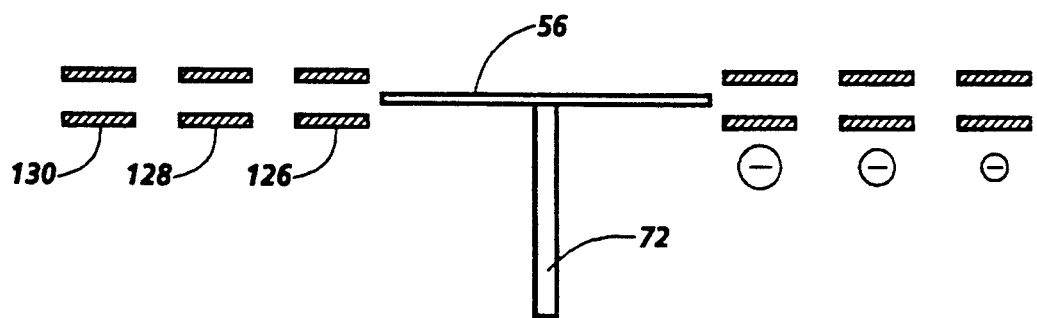
FIG. 9 is a schematic view of the spinning disc ball generator with an alternative embodiment of the outboard electrodes.

A problem that had been encountered in some experiments was the premature collision of balls, i.e. before they are fully hardened. This problem has been abated by the provision of the outboard electrode structure illustrated in FIG. 8. A pair of stationary disc electrodes 120 and 122 mounted outboard of the spinning disc separator member 38 and equidistant therefrom have a voltage on the order of $-12000$ volts DC (just below the onset of sparking) applied thereto by source 124, relative to the electrically grounded disc. An electric field is established between the negative potential on the electrodes and the positive (ground) potential on the spinning disc. If there is any conductivity at all in the liquids, a positive charge will be induced in the ligaments and in the balls and the balls will be accelerated toward the electrodes. A balanced field between the electrodes 120, 122 causes the balls to fly between them. Collisions are reduced since the induced charges cause the balls to be repelled from one another. In the above embodiment, the hardened balls will tend to accumulate on the electrodes 120, 122. If it is found to be undesirable for the balls to accumulate on the electrodes 120, 122, the electrode design could be modified as shown in FIG. 9. Concentric electrode pairs 126, 128 and 130 are provided with the potential on each pair being reduced from the next adjacent pair as indicated schematically. The balls will then accumulate beyond the outermost electrode pairs 130. This arrangement can also be used to more rapidly slow down the balls.

Figure 10:
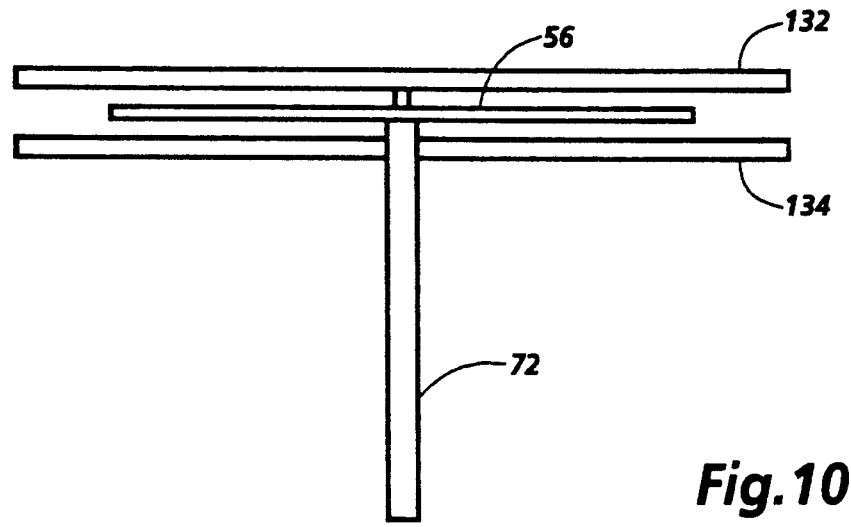
FIG. 10 is a schematic view of the spinning disc ball generator with top and bottom shrouds in place to diminish the turbulence of the air into which the balls are ejected.

Another problem that had been encountered was the significant decrease in yield of perfectly hemispherical bichromal balls, due to a spiralling of one pigment into the other. This problem is attributed to cross winds, created by the spinning disc, which distort the droplets as they leave the ligaments. It has been found that the embodiment of FIG. 10 abates this problem, resulting in greatly increased yield. Top and bottom shroud discs 132 and 134 are mounted upon the rotatable dispensing assembly, moving with it, so that they are closely spaced from the surfaces of the disc and extend radially outwardly of the disc. This causes the air between the shrouds to move as a unit with the spinning disc, presenting relatively quiescent air moving with the ligaments and the balls. An example of the experimental dimensions of these elements is as follows: a 20 mil disc, 3 inches in diameter has 5 inch diameter shroud discs spaced 90 mils apart, i.e. each is spaced of about 35 mils from its respective surface of the disc.

Figure 11:
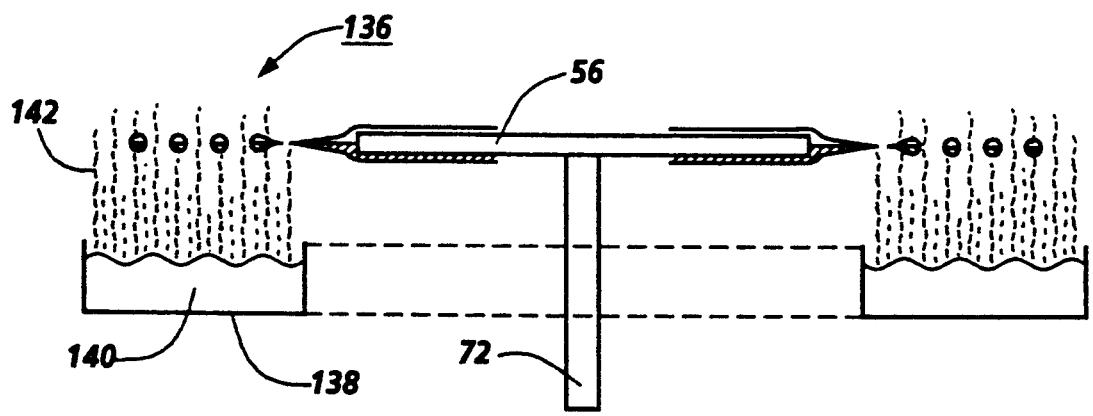
FIG. 11 is a schematic view of the spinning disc ball generator modified to provide a cooling zone to accelerate ball hardening.

While it has been stated that the liquid material should not solidify prematurely, it is also understood that the balls should solidify as soon as possible after formation. Cooling may be accelerated by the having the balls pass through a cooling zone as illustrated in FIG. 11. This has been accomplished experimentally by placing trays 136, containing liquid nitrogen, beneath the spinning disc so that the balls move through the cold liquid nitrogen vapors shortly after being formed. This insures hardening at the appropriate location.

Figure 12:
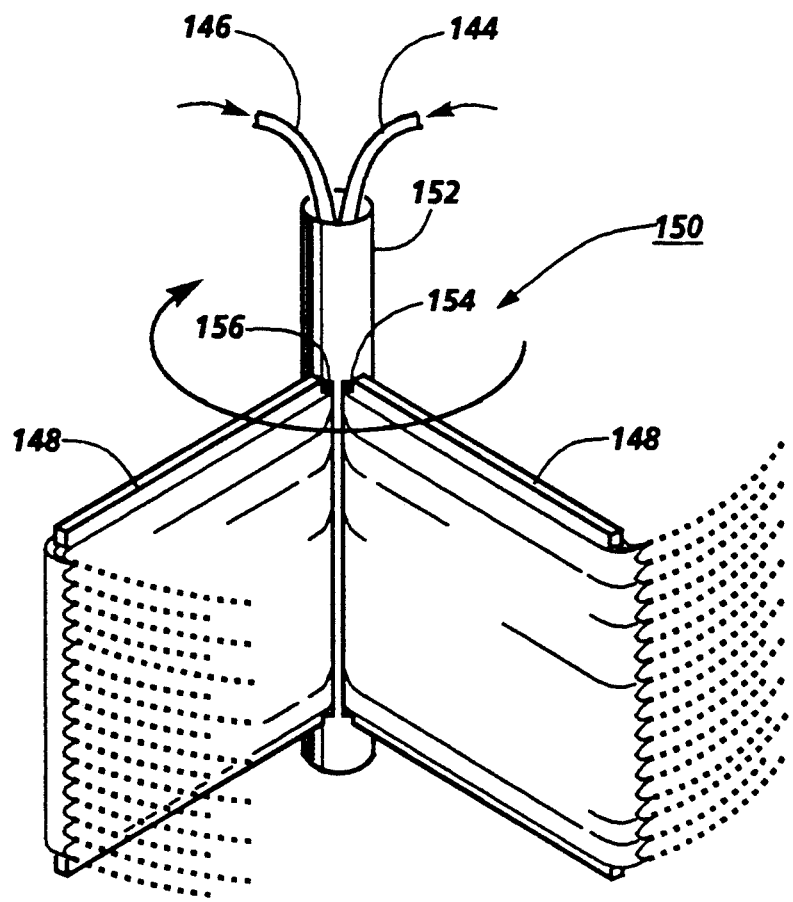
FIG. 12 is a schematic perspective view of a spinning paddlewheel separator.

A still further embodiment of this invention is illustrated in FIG. 12, in which two hardenable liquid materials are delivered through hoses 136 and 138 to be introduced to the two surfaces of each blade 140 (only two shown) of a paddlewheel assembly 142 rotated about axle shaft 144. Suitable metering orifices, such as 146 and 148 are provided through the axle shaft at both sides of the root of each blade. In a manner similar to that described above, with respect to the preferred spinning disc embodiment, the liquids are moved over the opposing surfaces of the blades by centrifugal force. They flow over the edge together, but do not mix, and form outboard reservoirs from which ligaments extend and balls are expelled.

It should be understood that numerous changes in details of construction and the combination and arrangement of elements and materials may be resorted to without departing from the true spirit and scope of the invention as hereinafter claimed.

What is claimed:

1. Apparatus for fabricating bichromal balls, comprising
    a separator member having a first surface, a second surface located opposite said first surface and an edge region in contact with both said first and second surfaces,
    means for flowing first and second, differently colored, hardenable, liquid materials over said first and second surfaces, respectively, toward said edge region so that said first and second liquid materials arrive at said edge at substantially the same flow rate and form a reservoir of said liquid materials outboard of said edge region, said reservoir being comprised of side-by-side regions of said first and second liquid materials,
    means for propelling said first and second liquid materials out of said reservoir into a fluid medium as a plurality of bichromal streams having side-by-side portions of different colors, the forward end of each stream being unstable and breaking up into droplets which form into spherical balls, each of said balls comprising hemispheres of differently colored hardenable liquid, and
    means for collecting said bichromal balls.

2. The apparatus as defined in claim 1 wherein said separator member is a rotatable disc, said means for flowing includes delivery and metering members for dispensing each of said liquid materials to opposite surface of said disc, and said means for propelling includes a motor for spinning said disc.

3. The apparatus as defined in claim 1 further comprising electrodes for attracting said balls away from said edge region.

4. The apparatus as defined in claim 2 further comprising electrodes for attracting said balls away from said edge region, said electrodes comprising a pair of ring members spaced radially outwardly of said disc, each of said ring members being equidistant from said disc, and a source of electrical potential connected to said electrodes.

5. The apparatus as defined in claim 4 wherein said electrodes comprise a plurality of pairs of co-planar ring members each spaced radially outwardly of said disc, each of said ring members in a given pair being equidistant from said disc, each of said pairs of electrodes having a different electrical potential applied thereto, whereby the potential applied to said pairs of electrodes is inversely proportional to their distance from said disc.

6. The apparatus as defined in claim 2 further including shroud means for causing the air in the vicinity of said disc to move as a unit with said disc.

7. The apparatus as defined in claim 2 further including a pair of shroud discs movable as a unit with said rotatable disc, each shroud disc being spaced axially relative thereto and extending radially outwardly therefrom for causing the air in the region between said shroud discs to move as a unit with said rotatable disc.

8. The apparatus as defined in claim 2 further comprising means for accelerating the hardening of said balls.

9. The apparatus as defined in claim 2 further comprising means for creating a cooling zone outboard of said disc through which said balls must travel before they are hardened.

10. The apparatus as defined in claim 2 further comprising a source of cooling vapor and means for introducing said vapor into a zone through which said balls pass prior to the time they are hardened.

11. The apparatus as defined in claim 1 wherein said separator member comprises a radially extending blade secured at one end to a rotatable shaft and said means for flowing includes delivery and metering members for dispensing each of said liquid materials to opposite surface of said blade, and said means for propelling includes a motor for spinning said shaft.

12. Method for fabricating bichromal balls, comprising the steps of
    flowing first and second, differently colored, hardenable, liquid materials over the opposite surfaces of a separator member and toward an edge thereof so that said first and second liquid materials arrive at said edge at substantially the same flow rate,
    forming a reservoir of said first and second liquid materials outboard of said edge, said reservoir being comprised of side-by-side regions of said first and second liquid materials,
    propelling said first and second liquid materials out of said reservoir into a fluid medium as a plurality of bichromal streams having side-by-side portions of different colors,
    causing the forward end of each stream to be unstable and to break up into droplets which form into spherical balls, each of said balls comprising hemispheres of differently colored hardenable liquid, and
    collecting said bichromal balls.

13. The method as defined in claim 12 wherein said step of propelling comprises spinning said separator member.

* * * * *